United States Patent
Brown et al.

(10) Patent No.: US 7,871,012 B2
(45) Date of Patent: Jan. 18, 2011

(54) SMART CARD ADAPTOR

(75) Inventors: Michael K. Brown, Kitchener (CA);
Michael S. Brown, Waterloo (CA);
Michael G. Kirkup, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1001 days.

(21) Appl. No.: 11/677,938

(22) Filed: Feb. 22, 2007

(65) Prior Publication Data
US 2007/0194132 A1    Aug. 23, 2007

Related U.S. Application Data

(63) Continuation-in-part of application No. 11/358,096, filed on Feb. 22, 2006, now Pat. No. 7,506,821.

(51) Int. Cl.
*G06K 19/06* (2006.01)
(52) U.S. Cl. .................. 235/492; 235/380; 235/441; 235/451; 235/491; 235/386
(58) Field of Classification Search .............. 235/441, 235/451, 486, 439, 492
See application file for complete search history.

(56) References Cited

U.S. PATENT DOCUMENTS

| | | | |
|---|---|---|---|
| 5,664,157 A | 9/1997 | Takahira et al. | |
| 2005/0109841 A1 | 5/2005 | Ryan et al. | |
| 2005/0274803 A1* | 12/2005 | Lee | 235/439 |

FOREIGN PATENT DOCUMENTS

DE    19939956 A1    3/2001
WO    0115075 A1    3/2001
WO    2004029860 A    4/2004

OTHER PUBLICATIONS

Computer Security Division, NIST, "Personal Identity Verification (PIV) of Federal Employees and Contractors", FIPS PUB 201, Feb. 25, 2005, Internet (http://www.smartcardalliance.org/resources/pdf/FIPS_201_022505.pdf).
"New PC Card Reader Supports Contact and Contactless", SecureIDNews, Sep. 1, 2004, Internet (http://www.secureidnews.com/weblog/2004/09/01/new-pc-card-reader-supports-contact-and-contactless/).
MCS, "Contactless Card Interface Technology", originally accessed Jun. 2005, Internet (http://www.mcs-group.com.my/contactless.htm).

* cited by examiner

*Primary Examiner*—Michael G Lee
*Assistant Examiner*—Kristy A Haupt
(74) *Attorney, Agent, or Firm*—Jenna L. Wilson; Dimock Stratton LLP

(57) ABSTRACT

A portable adaptor for using a smart card of a first configuration with a smart card reader of a second configuration. For instance, the adaptor may enable use of a contactless smart card with a contact smart card reader, or vice versa. The adaptor is provided with a casing that is configured to engage a contact smart card or a contactless smart card, and where intended for use with a contact smart card reader is provided with an exterior portion that physically cooperates via a contact pad with a contact smart card reader. The adaptor is provided with an interface passing signals between a smart card of a first configuration and a smart card reader, of a second configuration. For instance, an interface for passing signals between a contact smart card and a contactless smart card reader or vice versa.

18 Claims, 1 Drawing Sheet

SMART CARD ADAPTOR

This invention relates generally to smart cards, and specifically to an adaptor for converting a contact smart card to a contactless smart card or vice versa.

Smart cards, also referred to as chip cards or integrated circuit cards, are devices with an embedded integrated circuit (such as a microprocessor and/or memory) for use as storage of sensitive data or user authentication. Smart cards may comprise memory for storing financial or personal data, or private data such as private keys used in the S/MIME (Secured Multipurpose Internet Mail Extensions) encryption technique. Preferably, some of this data may be secured using a PIN (personal identification number) or a password as an access control measure. In order to access the protected data stored in the card's memory, a user must be validated by providing the correct PIN or password.

Typically, the smart card itself does not include a data entry device for direct entry of a PIN or password for the purpose of user identification. The smart card is rather used in conjunction with a smart card reader that is in communication with an input device. When the smart card is in communication with the smart card reader, a PIN or password may be provided to the smart card by the user via the input device to the smart card reader. The smart card, upon receipt of the PIN or password, is then configured to take steps to verify the PIN or password and authenticate the user. A verification signal is then provided by the smart card to the smart card reader.

Smart cards are typically provided in standardized form factors, such as approximately credit-card sized form factors, for ease of handling by users. The smart card interfaces with the reader either via a physical contact pad on the exterior of the card, in the case of a contact smart card, or via an antenna embedded in the card which receives power from a radiofrequency (RF) field generated by the card reader, in the case of a contactless smart card. Most smart cards that are deployed operate either as a contact smart card or as a contactless smart card, and the readers that are deployed to be used with those cards are thus contact card readers or contactless card readers.

However, when an existing contact or contactless smart card reader installation is to be expanded or upgraded, the expansion or upgrade may require the use of smart card readers and/or smart cards that are intended to operate on a contactless or contact basis, respectively. It is not necessarily practical to replace contact or contactless smart card readers with readers capable of reading both contact and contactless smart cards, or to replace all users' smart cards with a contactless or contact smart card to function with the smart card readers installed in a given environment. Accordingly, it is desirable to provide a system for allowing a contact smart card to be adapted for use with a contactless smart card reader, and/or for allowing a contactless smart card to be adapted for use with a contact smart card reader, without requiring the user to replace the original smart card or replacing or retrofitting an existing smart card reader.

General

In an embodiment, a portable adaptor may be provided for using a smart card of a first configuration with a smart card reader of a second configuration. Preferably, the adaptor is configured to adapt a signal level of the smart card reader to energize and interface with the smart card.

In an aspect of the embodiment, the adaptor may be adapted to boost the signal level of the smart card reader to a level sufficient to energize the smart card. In an alternate aspect of the embodiment, the adaptor is adapted to limit the signal level of the smart card reader to a level sufficient to energize the smart card.

In accordance with a first preferred embodiment, there may be provided a portable adaptor for using a contactless smart card with a contact smart card reader. The adaptor comprises: a casing having an interior and an exterior, the exterior of the casing being configured to physically cooperate with the contact smart card reader; means adapted for interfacing a contactless smart card placed in or near the adaptor with the contact smart card reader, and means adapted for regulating electrical signals received from the contact smart card reader to electromagnetic signals of a required level sufficient to energize the contact smart card.

Preferably, the means adapted for interfacing a contactless smart card placed in or near the adaptor with the contact smart card reader comprises: an external contact module for receiving and transmitting electrical signals from and to the contact smart card reader, the external contact module being disposed on the exterior of the casing such that the external contact module can be placed in physical contact with a contact pad on the contact smart card reader, and a transceiver in communication with the external contact module for converting electrical signals received by the external contact module to electromagnetic signals for reception by the contactless smart card, and for converting received electromagnetic signals from the contactless smart card to electrical signals to be transmitted by the external contact module to the contact smart card reader.

In accordance with a second preferred embodiment, there may be provided a portable adaptor for using a contact smart card with a contactless smart card reader, comprising: a casing having an interior and an exterior, the interior of the casing being configured to removably engage a contact smart card; means adapted for interfacing a contact smart card inserted in the adaptor with a contactless smart card reader, and means adapted for regulating electromagnetic signals received from the contactless smart card reader to electrical signals of a required level sufficient to energize the contact smart card.

Preferably, the means adapted for interfacing a contact smart card inserted in the adaptor with a contactless smart card reader comprises: an internal contact module for receiving and transmitting electrical signals from and to a contact smart card removably engaged in the casing; and a radiofrequency interface in communication with the internal contact module and with an antenna for converting electrical signals received by the internal contact module to electromagnetic signals for reception by a contactless smart card reader, and for converting electromagnetic signals received from the contactless smart card reader to electrical signals to be transmitted by the internal contact module to the contact smart card.

In accordance with a third preferred embodiment, there may be provided a portable adaptor for using a contact smart card with a contactless smart card reader and a contactless smart card with a contact smart card reader, comprising: a casing having an interior and an exterior, the interior of the casing being configured to removably engage a contact smart card, the exterior of the casing being configured to physically cooperate with a contact smart card reader; means adapted for interfacing a contactless smart card placed in or near the adaptor with a contact smart card reader; and means adapted for interfacing a contact smart card removably engaged in the adaptor with a contactless smart card reader.

In another aspect, there may be provided a method of facilitating use of a contact smart card with a contactless smart card reader or a contactless smart card with a contact smart card reader by providing a portable adaptor according to any of the first to third preferred embodiments.

BRIEF DESCRIPTION OF THE DRAWINGS

In drawings which illustrate by way of example only a preferred embodiment of the invention.

DESCRIPTION OF PREFERRED EMBODIMENTS

In the prior art, a typical smart card system comprises a smart card reader (not shown), which may be a contact reader or a contactless reader, which is operatively connected to an input device (not shown). As is well known in the art, a contact reader is provided with a contact pad and preferably a slot for receiving a smart card, such that when a contact smart card is inserted in the contact reader, a contact module provided on the contact smart card makes physical contact with the contact pad in the contact reader, by which means the reader can transmit power and instructions and receive data from the contact smart card. A contactless reader is provided with a transceiver, which comprises an antenna, a digital signal processor, and a radiofrequency circuit; the contactless reader transceiver generates an electromagnetic field, which is used to power a contactless smart card held within the proximity of the contactless reader, and the transceiver is capable of receiving data from the contactless smart card by detecting changes in the electromagnetic field induced by the contactless smart card. The reader and the input device may be contained in the same physical unit. If the reader and the input device are not integrated, then the input device may communicate with the smart card reader either by a direct wired connection, such as via USB (Universal Serial Bus) or by a wireless communication link in accordance with a standard such as the Institute of Electrical and Electronic Engineers (IEEE) 802.11a/b/g standard for wireless local area networks, Bluetooth®, Zigbee®, and the like, or future standards for wireless, preferably short-range, communication.

Figure 1:
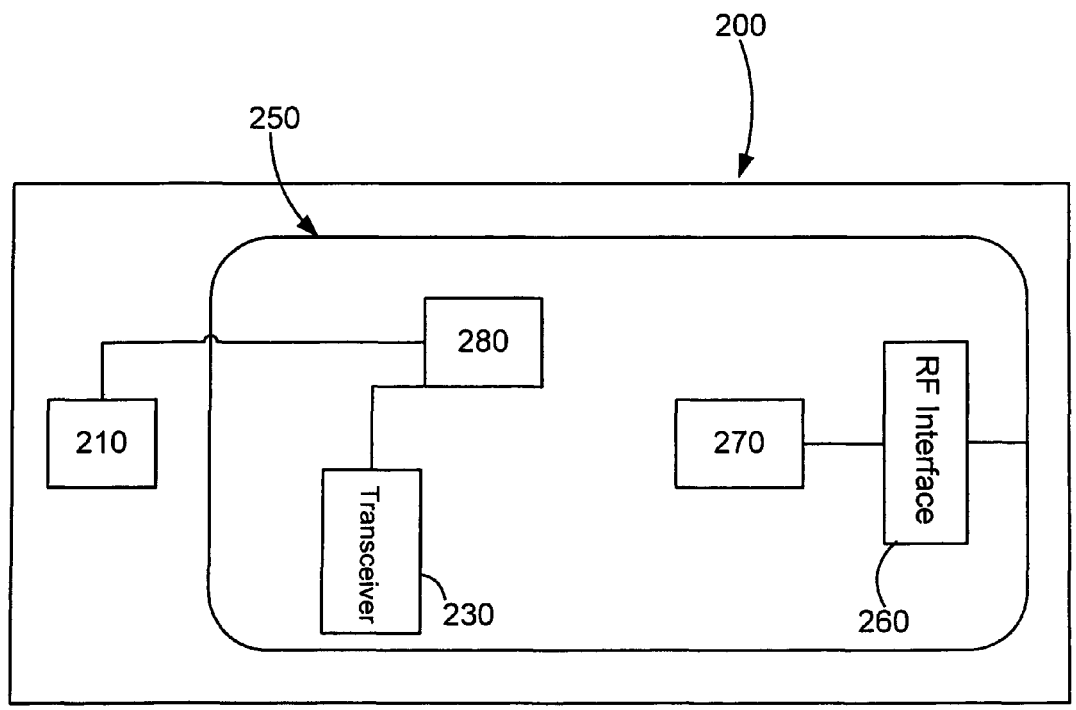
FIG. 1 is a block diagram of a smart card adaptor combining all of the preferred embodiments.
Figure 2:
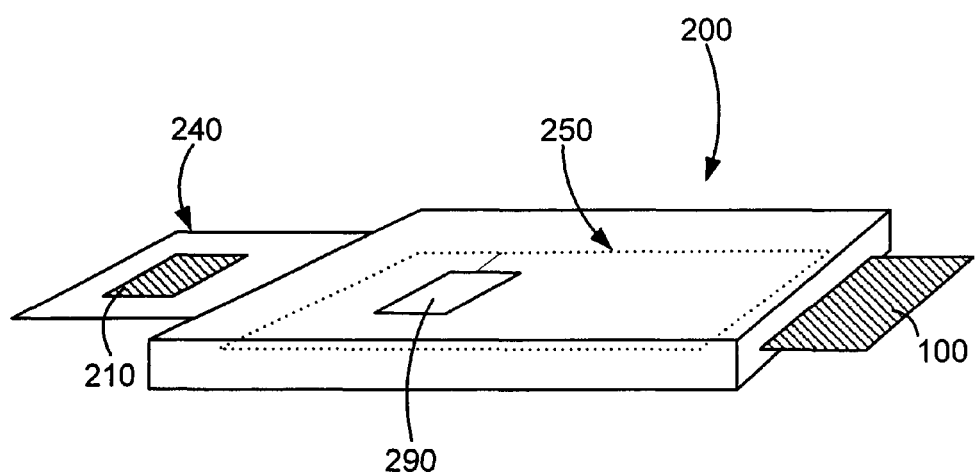
FIG. 2 is a perspective view of a smart card adaptor and smart card.

A preferred embodiment of a smart card adaptor 200 is shown in FIGS. 1 and 2. As can be seen in FIG. 2, the adaptor 200 is capable of receiving a smart card 100, which may be a prior art contact smart card or contactless smart card. Preferably, the smart card 100 is engaged with the adaptor 200 by means of a frictional contact or a spring-biased contact, so that a user can easily remove the smart card 100 from the adaptor 200 without the application of excessive force. If the smart card 100 is a contact smart card, it is preferably provided with a physical contact portion (not shown) in accordance with ISO/IEC 7816 published by the International Organization for Standardization, which contact portion would normally provide an interface with a prior art contact smart card reader for data communication between the card 100 and the reader, and further provides any necessary power to the card itself. If the smart card 100 is a contactless smart card (not shown), it preferably operates in accordance with ISO/IEC 10536, 14443, or 15693, which define standards for close-coupled, proximity, and vicinity smart cards, respectively. Contactless smart cards are not required to maintain physical contact with a contactless smart card reader in order to function, but rather communicate with the reader with an antenna and a radiofrequency interface, and are powered by an electromagnetic field generated at the reader. A typical form factor for the smart card 100 is the "credit card" type form factor, although the smart card 10 may be comprised in another form factor or device that provides the functionality for communication with a smart card reader, such as a SIM card.

The smart card adaptor 200 will be described first in relation to its use as an adaptor for converting a contactless smart card for use with a contact smart card reader. Referring to FIG. 1, in a preferred embodiment, the smart card adaptor 200 is provided with an external contact module 210 in communication with an optional processor 280, which in turn is in communication with a transceiver 230. The transceiver 230 may be in direct communication with the external contact module 210. The external contact module 210 is preferably similar to the contact modules known in the art and provided on contact smart cards, and is preferably provided with the same contacts (such as Vcc, reset, clock, ground, and input/output) that are defined by ISO 7816. As can be seen from FIG. 2, preferably the external contact module 210 is provided on an external portion 240 of the adaptor 200, the external portion 240 being sized to physically cooperate with a contact smart card reader, and the external contact module 210 being positioned to physically engage the contact pad of the contact smart card reader when the external contact module 210 is in physical cooperation with the reader. Most preferably, the adaptor 200 is sized to provide a portable means for carrying the smart card 100 without adding appreciable bulk or weight to the smart card 100.

Preferably, the transceiver 230 is configured to receive signals from the external contact module 210 when the adaptor is engaged with a contact smart card reader, and is receiving power and signals from the contact smart card reader via the external contact module 210. The transceiver 230 preferably comprises an oscillator or radiofrequency circuit, a digital signal processor, and an antenna. It will be appreciated that while the transceiver 230 is defined to include several components including an antenna, it would also be possible for transceiver 230 to use an external antenna such as antenna 250 for communications.

When the transceiver receives an initialization signal from the external contact module 210, the transceiver 230, powered by the contact card reader via the contact module 210, initializes a wireless protocol with a contactless smart card 100 inserted in the adaptor 200. As is known in the art in relation to contactless smart cards and contactless smart card readers, the transceiver 230 creates an electromagnetic field and transmits information to the smart card via the electromagnetic field; the contactless smart card 100 within the adaptor 200 is thus initialized via the electromagnetic field generated by the transceiver 230. The transceiver 230 receives information from the contactless smart card 100 by detecting changes in the electromagnetic field caused by the contactless smart card 100, for example in accordance with ISO 10536, 14443, or 15693, and converts the received data to a signal that is transmitted via the output contact of the external contact module 210 to the contact card reader in accordance with ISO 7816. The optional processor 280 may act as an interface between the external contact module 210 and the transceiver 230, converting the signals received from the external contact module 210 to a signal that can be processed by the transceiver 230 for conversion to an electromagnetic signal and vice versa. The adaptor 200 thus acts as a "dumb" contactless card reader, which transmits instructions to and receives data from the contactless card 100 within the adaptor 200, and transmits data to and receives instructions from the contact card reader in physical cooperation with the adaptor 200.

When the smart card adaptor 200 is used as an adaptor for converting a contact smart card to a contactless smart card, a contact smart card 100 as known in the prior art is engaged in the adaptor 200. The contact pad provided on the contact smart card 100 is placed in physical contact with an internal contact module 270, shown in FIG. 1. The internal contact module 270 is connected to a radio frequency interface 260, which in turn is connected to an antenna 250. The antenna 250 is preferably formed of multiple turns of a conductive medium, such as wire or a conductive ink, embedded within the adaptor 200, similar to the configuration of the antenna in a contactless smart card.

When the smart card adaptor 200 is placed in the vicinity of a prior art contactless smart card reader, the electromagnetic field generated by the contactless smart card reader induces a current in the antenna 250 which is used to transmit signals to the internal contact module 270 via the RF interface 260. Optionally, the RF interface 260 and the optional processor 280 may be provided in the same integrated circuit, reducing the number of separate components in the adaptor 200. The internal contact module 270 then transmits the received siganls to the contact smart card 100 via the contact pad on the contact smart card 100, again in accordance with techniques known in the art. The contact smart card 100 is thus powered through the internal contact module 270, which receives a current from the antenna 250 so long as the contact smart card 100 and the adaptor 200 is within the vicinity of a contactless smart card reader. The adaptor 200 thus operates as a "dumb" contact card reader, transmitting instructions to and receiving data from the contact smart card 100, and transmitting data to and receiving instructions from the contactless card reader.

Thus, the adaptor 200 may act as a pass-through, allowing data to pass between a medium of a first format and a medium reader of a different format without the adaptor 200 otherwise altering or interpreting the data.

Optionally, it may be necessary to include a signal booster, or voltage pump, to the internal contact module 270 to supply an amplified current to the contact card. As will be appreciated by the person skilled in the art, the necessity of including a signal booster, and the requisite level of amplification, is dependent upon the characteristics of a particular embodiment including: the power requirements of the contact smart card 100, the signal strength of the contactless smart card reader, the distance between the contactless smart card reader and the antenna 250, and the speed of data transmission.

A signal booster is generally not required for standard readers, as the reader is designed to provide sufficient power to activate the type of card with which the reader has been designed to operate. Since the present invention permits a card to operate with a reader for which it was not intended to operate, the power provided by the reader may not be sufficient for the requirements of the card. In such a situation, a signal booster may be provided that amplifies the signal to a card depending upon the requirements of that card type.

In an embodiment, a portable adaptor may be provided with a signal booster that provides an appropriate signal level to energize and communicate with a smart card, regardless of the signal level delivered by a smart card reader to the portable adaptor. By way of example, an adaptor configured to receive a contactless smart card would convert a contact smart card reader signal to a level appropriate to energize the contactless smart card. In such a fashion, the adaptor not only provides a physical interface between a smart card of a first configuration, and a smart card reader of a second configuration, but it also adapts a signal generated by the smart card reader according to the second configuration to energize and communicate with the smart card of the first configuration.

Thus, the smart card adaptor may be operable to energize a smart card of a first configuration by amplifying, or reducing, the signal of a smart card reader of a second configuration, where the smart card reader would not otherwise be capable of successfully energizing and communicating with the smart card. The portable adaptor may include, for instance, a power source and circuitry to boost the level of a signal received from a smart card reader to a level sufficient to energize a smart card engaged with the adaptor.

In circumstances where a smart card reader signal level might be too large for a smart card, the portable adaptor may include, for instance, circuitry to limit the level of a signal received from a smart card reader to a required level for energizing a smart card engaged with the adaptor.

Similarly, the smart card adaptor may be operable to boost or limit a signal received from a smart card to a level sufficient for communication with smart card reader. In such a fashion, the smart card adaptor may permit a smart card of a first configuration to be energized by, and read by, a smart card reader of a second configuration.

It will be understood from the foregoing description relating to a preferred embodiment of the adaptor comprising a combined form of said adaptor, that an adaptor comprising only the means necessary for adapting a contact smart card for use with a contactless smart card reader may be provided. Furthermore, in a similar manner, an adaptor comprising only the means necessary for adapting a contactless smart card for use with a contact smart card reader may be provided.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A portable adaptor for using a contact smart card with a contactless smart card reader comprising:
    a casing having an interior and an exterior, the interior of the casing being configured to removably engage a contact smart card;
    means adapted for interfacing a contact smart card with a contactless smart card reader; and,
    means adapted for regulating electromagnetic signals received from the contactless smart card reader to electrical signals of a required level sufficient to energize the contact smart card.

2. The portable adaptor of claim 1, wherein the means adapted for interfacing a contact smart card with a contactless smart card reader comprises:
    an internal contact module for receiving and transmitting electrical signals from and to a contact smart card removably engaged in the casing; and
    a radiofrequency interface in communication with the internal contact module and with an antenna for converting electrical signals received by the internal contact module to electromagnetic signals for reception by a contactless smart card reader, and for converting electromagnetic signals received from the contactless smart card reader to electrical signals to be transmitted by the internal contact module to the contact smart card.

3. The portable adaptor of claim 2, wherein the electromagnetic signals received from the contactless smart card reader are sufficient to power the contact smart card.

4. The portable adaptor of claim 2, wherein the means adapted for regulating electromagnetic signals comprises a signal booster to amplify the electrical signals to the required level.

5. The portable adaptor of claim 4, wherein the adaptor further comprises a portable power supply.

6. The portable adaptor of claim 2, wherein the means adapted for regulating electromagnetic signals limits the electrical signals to the required level.

7. The portable adaptor of claim 1, wherein the adaptor does not comprise a microprocessor for executing security-related or memory-related instructions.

8. The portable adaptor of claim 1, wherein the adaptor only only acts as a pass-through for transferring data between a first format smart card and a second format smart card reader.

9. A method of facilitating use of a contact smart card with a contactless smart card reader by providing a portable adaptor as claimed in claim 1.

10. A portable adaptor for using a contactless smart card with a contact smart card reader, comprising:
  a casing having an interior and an exterior, the interior of the casing being configured to removably engage a contactless smart card;
  means adapted for interfacing the contactless smart card with a contact smart card reader; and,
  means adapted for regulating electrical signals received from the contact smart card reader to electromagnetic signals of a required level sufficient to energize the contactless smart card.

11. The portable adaptor of claim 10, wherein the means adapted for interfacing a contactless smart card with a contact smart card reader comprises:
  an external contact module for receiving and transmitting electrical signals from and to the contact smart card reader, the external contact module being disposed on the exterior of the casing such that the external contact module can be placed in physical contact with a contact pad on the contact smart card reader; and
  a transceiver in communication with the external contact module for converting electrical signals received by the external contact module to electromagnetic signals for reception by the contactless smart card, and for converting received electromagnetic signals from the contactless smart card to electrical signals to be transmitted by the external contact module to the contact smart card reader.

12. The portable adaptor of claim 11, wherein the electrical signals received from the contact smart card reader are sufficient to power the contactless smart card.

13. The portable adaptor of claim 11, wherein the means adapted for regulating electrical signals comprises a signal booster to amplify the electromagnetic signals to the required level.

14. The portable adaptor of claim 13, wherein the adaptor further comprises a portable power supply.

15. The portable adaptor of claim 11, wherein the means adapted for regulating electrical signals limits the electromagnetic signals to the required level.

16. The portable adaptor of claim 10, wherein the adaptor does not comprise a microprocessor for executing security-related or memory-related instructions.

17. The portable adaptor of claim 10, wherein the adaptor only only acts as a pass-through for transferring data between a first format smart card and a second format smart card reader.

18. A method of facilitating use of a contactless smart card with a contact smart card reader by providing a portable adaptor as claimed in claim 10.

* * * * *

UNITED STATES PATENT AND TRADEMARK OFFICE
CERTIFICATE OF CORRECTION

| | |
|---|---|
| PATENT NO. | : 7,871,012 B2 |
| APPLICATION NO. | : 11/677938 |
| DATED | : January 18, 2011 |
| INVENTOR(S) | : Michael K. Brown et al. |

Page 1 of 1

It is certified that error appears in the above-identified patent and that said Letters Patent is hereby corrected as shown below:

Column 1, line 22, delete "identification" and insert therefor --authentication--;

Column 5, line 22, delete "siganls" and insert therefor --signals--;

Column 7, line 17, delete the second occurrence of "only"; and

Column 8, line 31, delete the second occurrence of "only".

Signed and Sealed this
Fifteenth Day of March, 2011

David J. Kappos
*Director of the United States Patent and Trademark Office*